United States Patent
Bayha

[11] Patent Number: 5,802,783
[45] Date of Patent: Sep. 8, 1998

[54] HURRICANE RESISTANT/SECURITY WINDOWS/DOORS

[76] Inventor: Charles E. Bayha, 728 Tissington Dr., Collierville, Tenn. 38017

[21] Appl. No.: 760,437

[22] Filed: Dec. 4, 1996

Related U.S. Application Data

[60] Provisional application No. 60/009,989, Dec. 4, 1995.

[51] Int. Cl.[6] ........................................................ E06B 3/00
[52] U.S. Cl. .................. 52/204.5; 52/204.62; 52/745.19; 52/786.1; 52/786.11
[58] Field of Search ............................... 52/786.11, 786.1, 52/786.12, 204.5, 204.62, 745.19, 106

[56] References Cited

U.S. PATENT DOCUMENTS

| | | | |
|---|---|---|---|
| 3,825,920 | 7/1974 | Nelson et al. | 52/786.11 X |
| 4,027,443 | 6/1977 | Briggs | 52/786.11 X |
| 4,312,903 | 1/1982 | Molari, Jr. | 52/786.11 X |
| 4,333,282 | 6/1982 | Medlin | 52/786.11 X |
| 4,985,099 | 1/1991 | Mertens et al. | 52/786.11 X |
| 5,398,452 | 3/1995 | Schilde et al. | 52/786.11 X |
| 5,506,051 | 4/1996 | Levy-Borochov et al. | 52/786.11 X |

*Primary Examiner*—Christopher Kent
*Attorney, Agent, or Firm*—Spencer & Frank

[57] ABSTRACT

Glass clad/polycarbonate structures that can be fabricated to pass stringent impact resistant tests for hurricane resistant window qualifications and/or be used in security application such as bullet resistant side windows in automobiles. The window structure consists of two layers of glass held together with two sided adhesive tape. The function of the tape is to act as a resin diking system and to control the overall thickness of the glass composite. A polycarbonate film between the glass is held in place by a resinous adhesive. The polycarbonate film is smaller in length and width and essentially floats in the cured resin. Expansion and contraction of the polycarbonate film is not restricted in the highly flexible adhesive. Fatigue adhesion failure and subsequent delamination with time is virtually eliminated.

The framing structure involves mechanically bonding the frame to the window structure via nylon shims. These shims are placed through holes in the frame and glass and fastened to the outside of the frame. With the assistance of metal rollers on the bottom of the frame, the structure can move freely about in the frame. This movement is restricted with sealants. Upon impact the framing structure will absorb some of the energy as well as keeping the window in the frame.

10 Claims, 4 Drawing Sheets

HURRICANE RESISTANT/SECURITY WINDOWS/DOORS

CROSS-REFERENCE TO RELATED APPLICATION

This application claims the benefit of U.S. provisional application No. 60/009,989 filed Dec. 4, 1995.

FIELD OF THE INVENTION

The invention relates to hurricane resistant glass lamination composites useful in windows and doors.

TECHNOLOGY REVIEW

The need for high impact windows for hurricane resistance has become of increased importance in the Caribbean Islands and in the coastal areas of the United States. States, such as Florida have experienced severe commercial and residential real estate losses, as well as loss of life due to the devastation caused by hurricanes, e.g. Andrew and Opal. This problem has spurred studies to ascertain how the effects of the high winds created by the hurricane can be minimized. The degree and type of damage in Jacksonville, Fla. and Charleston, S.C., which were subjected to direct hits by strong hurricanes were investigated.

Based on these studies a number of recommendations for new construction and renovation for existing structures have been made by governmental and independent agencies. In addition to upgrading construction codes in high profile areas, replacement of current tempered windows by high impact windows was suggested. In Charleston, S.C., no failure of laminated windows were reported, whereas most windows with tempered glass failed.

One theory of hurricane resistant windows is that, in the absence of high winds in the interior of a building, the roof and walls of said building will remain intact and therefore minimize damage. Although this theory is controversial, the Florida State Building Code Agencies in Dade and Broward counties have instituted new requirements for high impact windows. These new codes have been spurred on by insurance companies who insist these changes in window codes must be made or commercial and residential insurance rates will dramatically increase. Some insurance companies have already left the state of Florida and others have threatened to follow suit. Resistance to these changes have come from the construction companies who feel these changes would severely and negatively impact new construction in Florida due to the high cost of these windows versus double framed float glass or tempered glass.

High impact windows have traditionally been used in the automotive market. Windshields in automobiles must be capable of preventing bodily harm to the driver and passengers in the car. Requirements include not only that the object not enter the interior of the car, but the glass laminate must remain in place, and in the event that the occupants of the car hit the windshield with their heads that the impact be soft (the laminate must have absorbing properties). In other words, the glass laminate windshield must be capable of flexing in either direction from impact and remain in place. This type of glass laminate construction contains a flexible plastic film interlayer. In addition to flexibility and toughness, the plastic interlayer must be optically clear and remain invisible to the observer over 10–20 years in the field (no yellowing or delamination). This type of film product has been in use in automobile construction for the past 50 years and has performed without significant problems. However, the side and back windows have been made from tempered glass and not glass lamination. Tempered and heat strengthened glass will sustain impacts, but once breached will catastrophically fail, although the particles of glass from this structure are not sharp and will not cut the occupants of the car. In the event of a car crash, the side and rear windows of tempered construction will shatter, allowing easy exit from the car.

Glass film lamination has been successfully used in a variety of applications including sliding glass doors, slope glazing, bullet resistant structures, insulation and sound deadening, to name a few. However, application of film technology to the construction of hurricane resistant glass has some compelling problems, both from a production and performance criteria.

SUMMARY OF THE INVENTION

A hurricane resistant window/door structure has now been developed that combines an impact resistant window structure with a unique framing system that will not only prevent wind and flying debris from entering the enclosed structure, but assists in keeping the glass structure in the frame.

A polycarbonate film is cut ¼" smaller in length and width than the glass piece. Catalyzed resin is placed above and below the film (20–30 mils). The film essentially floats in the adhesive resin with the glass pieces surrounding both the resin and film. This configuration allows the polycarbonate to freely expand in three dimensions in the very flexible cured resin system. This configuration virtually eliminates the tendency of polycarbonate structure to delaminate from plastic adhesives due to excessive expansion and contraction.

BRIEF DESCRIPTION OF THE DRAWINGS

The drawings illustrate a framing system that holds the glass lamination structure according to the invention and absorbs some impact energy, thus minimizing glass spalding.

DETAILED DESCRIPTION OF THE INVENTION

In order to pass the impact test, the glass structure has to remain in the frame. A highly flexible silicone adhesive that bonds the glass to the aluminum or steel frame may be used. Although the adhesive is slow to cure and expensive, upon impact the glass structure does remain in the frame. Unfortunately, the silicone adhesive does tend to embrittle with time and performance is affected by temperature as well as time.

Figure 1:
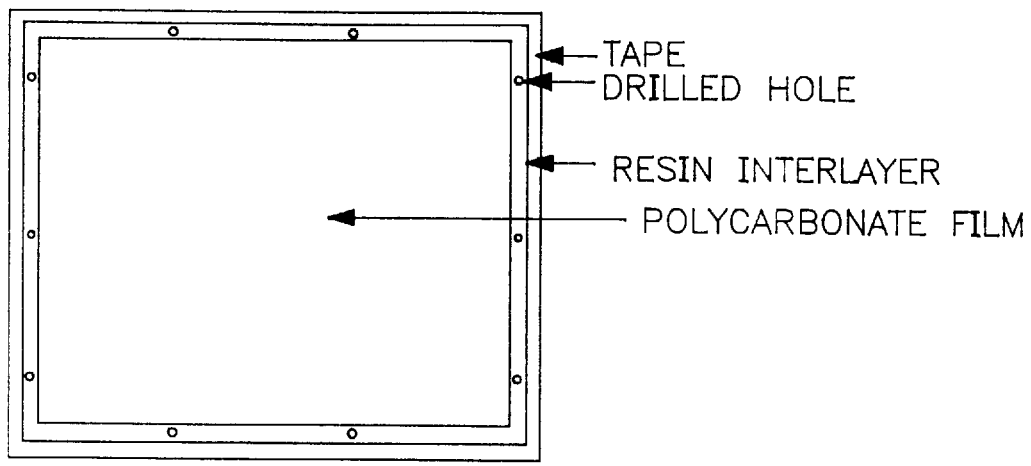
FIG. 1 illustrates a front view of a laminate according to the invention.
Figure 2:
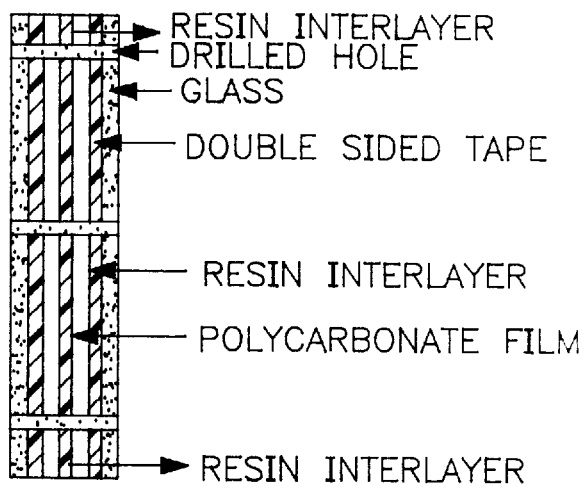
FIGS. 2 and 11 illustrate side views of a laminate according to the invention.

An improved method has now been developed that allows the window to flex upon impact. The preferred window frame is based on wood and approximately ⅛" to ¼" wider than conventional metal frames. Holes are drilled into the wood frames and glass structures (see FIG. 1). The window is attached to the frame with nylon shims. Steel rollers at the bottom of the frame allows the window structure to slide in the frame (maximum movement is ¼"). The window structure is placed snug against the other section of the frame where impact would take place. The space between the glass and inner section of the frame is then filled with semi-flexible urethane foam or similar other flexible sealants. The foam or sealant acts as restraints from glass movement but upon impact will act as an energy absorbing agent. The wood frame and the foam will contribute insulation properties to the window. The structure makes it virtually impossible for the window to come out of the frame upon impact. Neither temperature or time affect performance.

Insulated windows can easily be fabricated by using a second window with an air space in the conventional manner.

DESCRIPTION OF PREFERRED EMBODIMENTS

A polyester resin was prepared according to the procedure stated in U.S. Pat. No. 5,318,853, example I, incorporated herein by reference. The liquid resin has the following properties:

| | |
|---|---|
| Color: | A.P.H.A. 50 max. |
| Brookfield Viscosity @ 25° C.: | 330 cps |
| Monomer Content: | 42.0% |
| Specific Gravity: | 1.038 |
| Moisture (Karl Fischer): | 875 ppm |
| Room Temperature Reactivity: | 100 gms |
| (1% M.E.K.P. 9, catalyst: 1% silane adhesion promoter) | |
| Gel Time: | 55 min. |
| Peak Exotherm: | 96.5° F. |
| Cure Time: | 155 min. |
| Total Time: | 210 min. |

This resin acts as an adhesive in the glass lamination composites according to the present invention. The cured adhesive resin has the following properties

| | |
|---|---|
| Color (30 mil casting): | A.P.H.A. 30 max. |
| Tensile Strength, psi: | 1,250 |
| % Elongation: | 130 |
| % Area Shrinkage: | 4–5% |

Procedure

I. Glass

Two pieces of float glass are cut usually to a square or rectangular shape for a window or door, and cleaned with industrial cleaner and washed thoroughly with hot water. After drying, two sided tape is applied (60 mil in thickness) to the edge of one of two pieces of cleaned glass. The protective coating is left on the tape. The surfaces of both glass pieces are treated with a 5% solution of phosphoric acid in water and wiped dry. The glass with the tape applied is laid flat for resin addition. Thickness of the glass is 90 mil (single strength). The glass side that receives the resin should be the air side of the float glass. As those in the art are aware, float glass is made by "floating" a layer of molten glass on molten "tin." Hence, the side of the glass product facing the molten metal is the "tin" side and the opposite side is the "air" side. The outside glass surface should be the tin side, as determined by an ultraviolet lamp. The polycarbonate film (10 mils) is cut to size (¼" smaller in length and width than the glass) and the protective film is removed. The film is placed in an oven for 24 hours at 250° C. After removal from oven, and while still warm, the film is wiped with an alcohol solution containing low levels of adhesion promoter. Removal of the liquid is quickly performed.

II. Resin Catalysis:

The resin is measured volumetrically to fill the space between the glass and polycarbonate film to a thickness of 30 mils. Adhesion promoter and catalyst is added at 1 pph each to the resin.

The mix is stirred by bubbling in nitrogen. The whole is then placed in a vacuum chamber where the entrained and suspended bubbles are removed (5–10 minutes). The amount of resin mix is adjusted to create 30 mils of resin interlayers between the glass and the polycarbonate film.

III. Addition of Catalyzed Resin and Film to the Glass.

A glass-moving suction cup is applied to the bottom-middle of the glass piece with the tape. The catalyzed resin is poured in the middle of the glass which has been pulled down. The film is now laid in the resin puddle and positioned to be as even with the glass as possible. The second resin mix is added to the top of the film and spread as evenly as possible.

IV. Completion of the Laminate

The protective coating of the tape is removed and a second piece of glass is applied in an overlap position. The glass-moving suction cup is removed and needle probes are placed at all four corners.

V. Removal of air

A heavy piece of glass is placed on the laminate and air escapes through the needle probes. Some resin flash occurs. The needle probes are removed. Any air bubbles at the tape are removed by use of needle syringes. After one to one and a half hours, the glass structure can be placed in a warm room at 100°–110° F. After 24 hours, the glass laminate is ready for further modification.

Framing Structure

Figure 3:
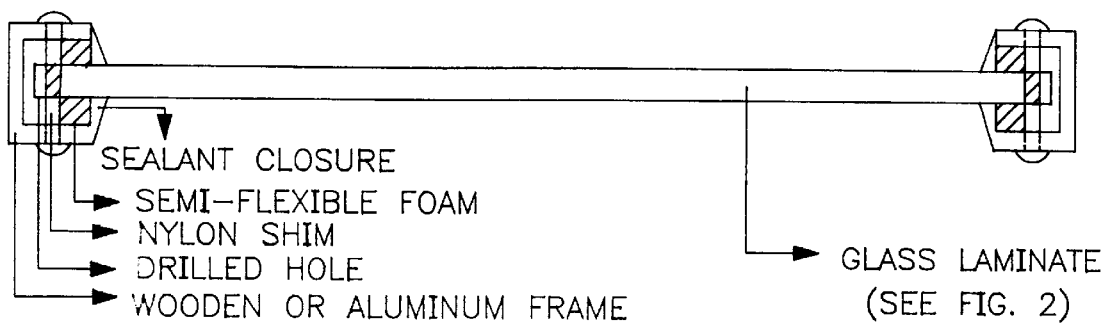
FIG. 3 illustrates a top view of a laminate according to the invention.
Figure 4:
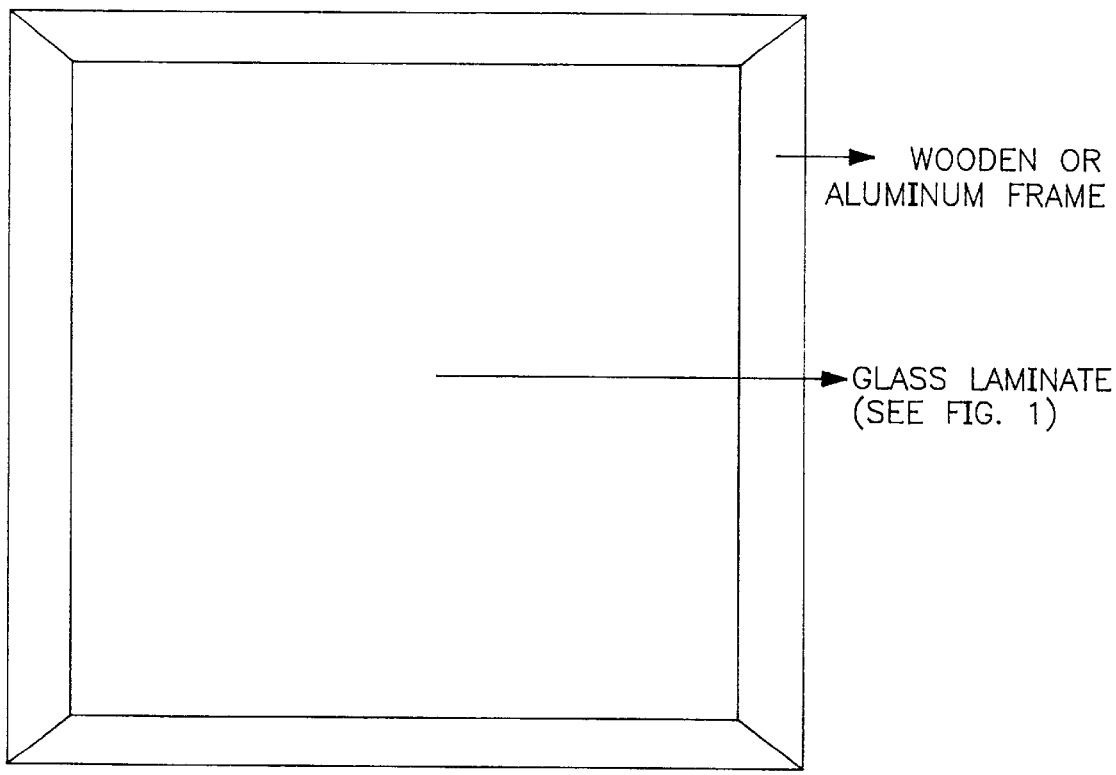
FIG. 4 illustrates a frame enclosing a laminate according to the invention.
Figures 5, 6:
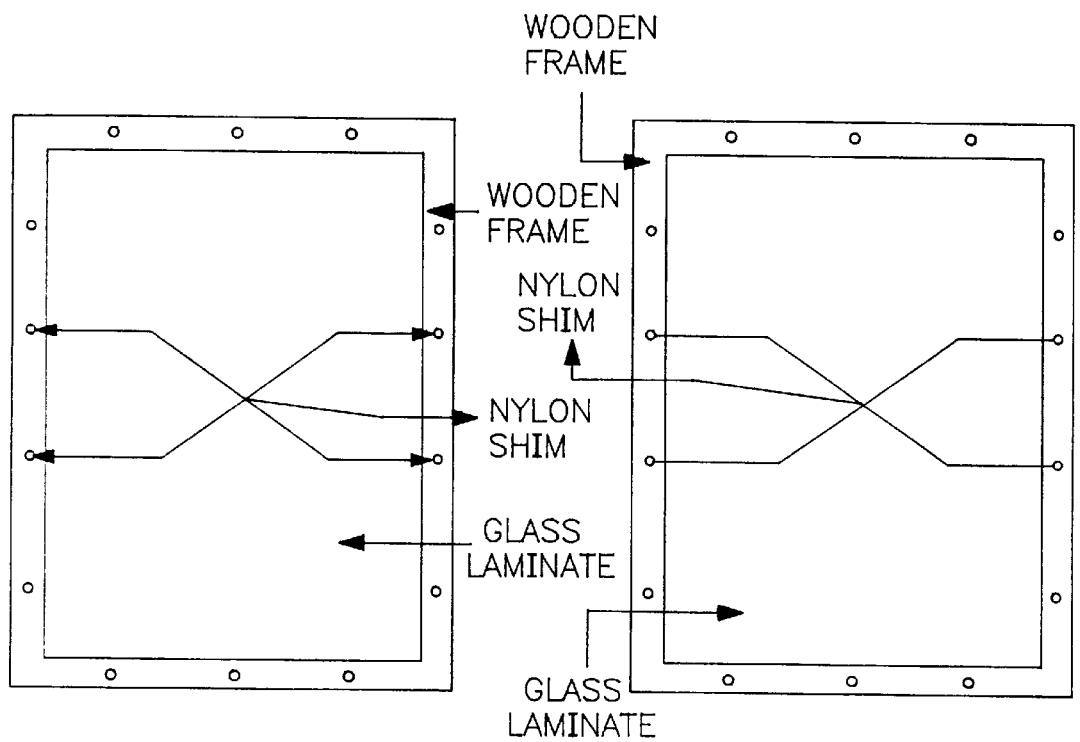
FIGS. 5 and 6 illustrate a front view and a rear view of a frame enclosing a laminate according to the invention.
Figure 7:
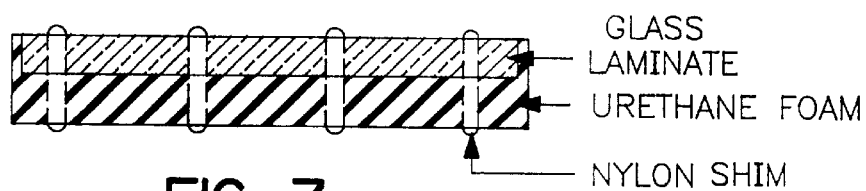
FIGS. 7, 8, and 9 illustrate top views of a frame enclosing a laminate according to the invention.
Figure 8:
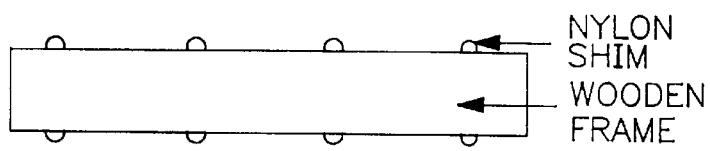
Figure 9:
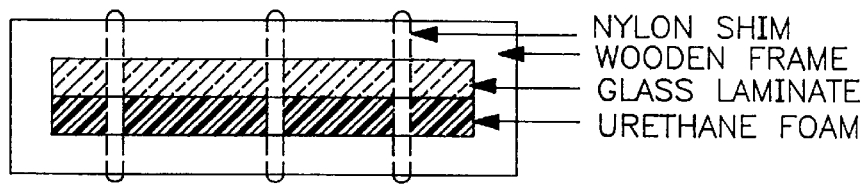
Figure 10:
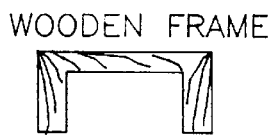
FIGS. 10, 12, and 13 illustrate top, bottom, and side views of a wooden frame adapted to hold a laminate according to the invention.
Figure 11:
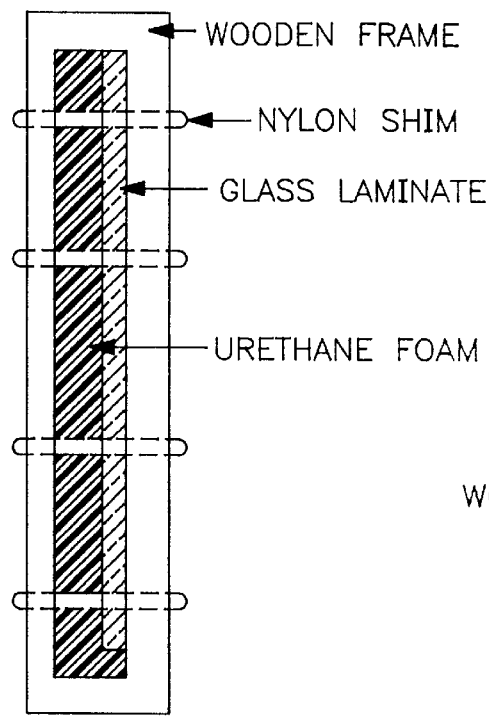
Figure 12:
Figure 13:
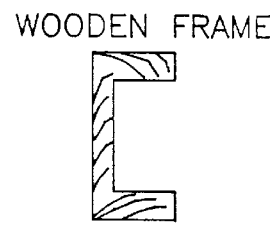

Holes are drilled through the glass laminate using a water jet cutter at the outer edge of the tape. The holes are perpendicular to the glass. At least five holes on the long side and 2 or 3 holes on the short side are necessary. A wooden frame is fabricated in which the glass laminate fits in tightly on one side. The thickness of the frame is ½". Holes corresponding to the holes in the glass are drilled perpendicular to the wooden frame to register with the holes drilled in the glass laminate. Nylon shins are placed through the holes in the wooden frame and the glass laminate and fastened on one side. The laminate rests on metal rollers so that the whole structure can move laterally. With the structure flush against one side of the frame, flexible foam is sprayed into the ¼" space between the laminate and frame. After the foam has cured, tape can be applied to mask the foam. (See FIG. 3)

Impact testing is done at the front of the frame. This structure passes the 2"×4" Impact Test with only minimal spalling occurring on impact. In some cases, the back piece of glass does not break.

Impact Resistant Testing. Polycarbonate is marguarded on the inside surface.

Configuration A 90 mils glass, 30 mils Resin A, 10 mils polycarbonate film, 30 mils resin A, 90 mils glass.

Configuration B 90 mils glass, 30 mils resin A, 30 mils polycarbonate film, 30 mils resin A, 90 mils glass.

Configurations of glass clad/polycarbonate structures that allow passage of Level 1 Bullet Resistant testing, A.S.T.M. 1792.

Configuration C 90 mils glass, 30 mils resin A, polycarbonate casting (1/8 inch).

Configuration D

1/4 inch glass, 30 mils resin A, 60 mils polycarbonate film.

Configurations of glass clad/polycarbonate structures that allow passage of Level 2.

Configuration E

1/4 inch glass, 30 mils resin A, polycarbonate casting (1/4 inch)

Configuration F

1/4 inch glass, 60 mils resin A, polycarbonate film (1/8 inch).

Glass Clad/Polycarbonate Adhesion and Environmental Testing

1. Tensile Adhesion

One sample of 1/8"×1/8" polycarbonate laminates were tested. The sample was prepared by laminating two 12"×12" with 30–35 mls of uncoated polycarbonate treated in a similar manner to the glass clad polycarbonate laminate previously prepared. After three days at room temperature, three samples were tested. Also tested were three samples each of the samples subjected to 0° C. for 24 hours and the three samples post-cured at 80° C. for five hours. The results are below:

|  | R.T. | 0° C. | 80° C. | 100° C. |
| --- | --- | --- | --- | --- |
| Average values of 3 samples (psi) | 1425 | 1380 | 1510 | 870 |

2. Environmental Testing

12"×12"×30 mL samples were prepared as described above. The samples were then cured at 80° C. for five hours. Three samples were placed in a freezer for 24 hours and then brought to room temperature for four hours. The samples were then placed in an oven at 125° C. for 24 hours. This process was repeated eight times. At no time was any delamination observed between the polycarbonate and glass.

Hurricane Resistant Requirements

In order to simulate the environment of a Class 5 hurricane (most severe), tests were devised to meet such requirements.

A. Impact Test

A seven foot 2"×4" piece of wood is fired from a aluminum cannon in which the force propel the missile is generated by compressed air.

B. Cycling Test

During a hurricane, pressures may vary dramatically. To simulate these conditions, the window is cycled after the impact test from pressure to vacuum. Failure represents loss of vacuum or loss of pressure.

C. Pressure Testing

To measure the strength of the window construction, high pressure is continually applied until failure. Usually, a minimum pressure rating is required.

D. Fire Testing

All candidates must submit samples for the following tests:

1. Tunnel Test, A.S.T.M. E-84
   Pass=75 flame spread (max.), 450 smoke (max.)
2. Vertical Burn, A.S.T.M. D 635
   Pass=self-extinguishing
3. Self Ignition A.S.T.M. 1929
   Pass=600° F. (min.)

E. Weathering Testing

1. Xenon Arc Exposure=A.S.T.M. G26 utilizing a 6500 watt lamp for 4500 hours
   Pass=no delamination or yellowing.

Bullet Resistant Applications

Although the glass lamination approach was designed for Hurricane Resistant application, the approach can be used for bullet resistant applications. For example, the system can be applied to side windows in automobiles for protection against drive-by shootings. By varying the thickness of the polycarbonate, a glass clad/polycarbonate window can be designed to offer various levels of bullet resistant protection. In the case of bullet resistant applications, glass can not be used inside due to severe glass spalling. The inside surface of the glass window laminate must be marguarded polycarbonate.

Typical structure and level protection are illustrated below:

Configurations:

1. Type 1
   90 mils glass, 30 mils resin, 10 mils polycarbonate
2. Type 2
   90 mils glass, 30 mils resin, 30 mils polycarbonate
3. Type 3
   90 mils glass, 30 mils resin, 60 mils polycarbonate
4. Type 4
   1 inch glass, 30 mils resin 1/8 inch polycarbonate
5. Type 5
   3/8 inch glass, 30 mils resin, 1/4 inch polycarbonate
6. Type 6
   1/2 inch glass, 30 mils resin, 1/2 inch polycarbonate Levels:

1. 1201 CRF Category 11
2. Level 0—3 shots with 32 caliber pistol
3. Level 1—3 shots with 9 millimeter pistol
4. Level 2—3 shots with 357 magnum pistol
5. Level 3—3 shots with 44 magnum rifle
6. Level 4—4 shots with 40 odd 6 rifle Results:

1. Type 1—passes 1201 CRF Category 11
2. Type 2—passes Level 0
3. Type 3—passes Level 1
4. Type 4—passes Level 2
5. Type 5—does not pass Level 3 but the missile does not have killing power
6. Type 6—does not pass Level 4 but the missile does deflect the first bullet but not the second or third.

The object of bullet resistant side windows in cars is to prevent fatalities with the thinnest and least costly glass laminate structure. For most pistol protection, either 60 mils or 1/8 mil polycarbonate films or castings will suffice.

Advantages of the glass/resin/polycarbonate/resin/glass composite:

1. The system has at least one glass side so that scratch resistance on that side is not a problem.
2. A relatively low cost system which can be automated to produce high volumes of laminated impact glass.
3. This specific resin based on tertiary butyl styrene possesses low shrinkage properties that allow for excellent adhesion to polycarbonate without affecting visual properties.
4. The cold cure lamination process does not require heat, pressure or UV radiation during fabrication.
5. The framing structure not only presents the structure from coming out of the frame but also absorbs some of the impact energy. Thus, less glass spalding occurs.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A laminate useful for a hurricane resistant window or door, comprising:
   a polycarbonate sheet having two opposite sides;
   a layer of tertiary butyl styrene resin on each of said opposite sides of said polycarbonate sheet, said layers of tertiary butyl styrene having two sides, one side adhering to said polycarbonate sheet and a second side; and
   at least one sheet of glass adhering to at least one of said second sides of said tertiary butyl styrene layers.

2. A laminate as set forth in claim 1, including a sheet of glass adhering to each of said second sides of said tertiary butyl styrene layers.

3. A process for producing a laminate useful for a hurricane resistant window or door, comprising:
   coating opposite sides of a polycarbonate sheet with layers of a tertiary butyl styrene resin, said layers of tertiary butyl styrene resin having two sides, one side adhering to said polycarbonate sheet and a second side; and
   adhering a glass sheet to at least one second side of said two tertiary butyl styrene resin layers.

4. A process for producing a laminate as set forth in claim 3, including adhering a glass sheet to each of said second sides of said tertiary butyl styrene layers.

5. A hurricane resistant window or door, comprising:
   a frame holding a laminate comprising:
      a polycarbonate sheet having two opposite sides;
      a layer of tertiary butyl styrene resin on each of said opposite sides of said polycarbonate sheet, said layers of tertiary butyl styrene having two sides, one side adhering to said polycarbonate sheet and a second side; and
      at least one sheet of glass adhering to at least one of said second sides of said tertiary butyl styrene layers.

6. A hurricane resistant window or door comprising:
   a frame holding a laminate comprising:
      a polycarbonate sheet having two opposite sides;
      a layer of tertiary butyl styrene resin on each of said opposite sides of said polycarbonate sheet, said layers of tertiary butyl styrene having two sides, one side adhering to said polycarbonate sheet and a second side; and
      a sheet of glass adhering to each of said second sides of said tertiary butyl styrene layers.

7. The hurricane resistant window or door as set forth in claim 5, including a foam layer between said frame and said laminate.

8. The hurricane resistant window or door as set forth in claim 6, including a foam layer between said frame and said laminate.

9. In a hurricane resistant window, the improvement comprising a laminate comprising:
   a polycarbonate sheet having two opposite sides;
   a layer of tertiary butyl styrene resin on each of said opposite sides of said polycarbonate sheet, said layers of tertiary butyl styrene having two sides, one side adhering to said polycarbonate sheet and a second side; and
   at least one sheet of glass adhering to at least one of said second sides of said tertiary butyl styrene layers.

10. In a hurricane resistant door, the improvement comprising a laminate comprising:
    a polycarbonate sheet having two opposite sides;
    a layer of tertiary butyl styrene resin on each of said opposite sides of said polycarbonate sheet, said layers of tertiary butyl styrene having two sides, one side adhering to said polycarbonate sheet and a second side; and
    at least one sheet of glass adhering to at least one of said second sides of said tertiary butyl styrene layers.

* * * * *